United States Patent [19]

Tomita et al.

[11] 4,206,931
[45] Jun. 10, 1980

[54] APPARATUS FOR FITTING A CYLINDER HEAD COVER

[75] Inventors: Tsutomu Tomita, Okazaki; Masahito Kato; Toshiaki Doryo, both of Toyota, all of Japan

[73] Assignee: Toyota Jidosha Kogyo Kabushiki Kaisha, Aichi, Japan

[21] Appl. No.: 928,166

[22] Filed: Jul. 26, 1978

[30] Foreign Application Priority Data

Aug. 4, 1977 [JP] Japan .................. 52-103784[U]

[51] Int. Cl.² ............................................. F16J 15/10
[52] U.S. Cl. .................................. 277/166; 85/50 R
[58] Field of Search .................. 85/1 JP, 50 R, 38; 277/166

[56] References Cited

U.S. PATENT DOCUMENTS

| 355,372 | 1/1887 | Bishop | 85/38 |
| 1,888,669 | 11/1932 | Hossfeld | 85/50 R |

Primary Examiner—Robert I. Smith
Attorney, Agent, or Firm—Blanchard, Flynn, Thiel, Boutell & Tanis

[57] ABSTRACT

An apparatus for fixedly securing a cylinder head cover to the cylinder head of an engine having a bolt embedded in and projecting outwardly of the engine so as to protrude through a hole in the cover. A cap nut is engaged with the outer end of the bolt for pressing the cover against the cylinder head. A seal packing and a washer are disposed in surrounding relationship to the bolt and confined between the cover and the cap nut. The seal packing includes an annular lip portion which projects axially of the seal packing and passes through a hole in the washer, which annular lip portion is disposed in snug sealing engagement with an end wall of the cap nut in surrounding relationship to the bolt. The washer preferably cooperates with at least two such bolts to prevent rotation of the washer.

5 Claims, 6 Drawing Figures

APPARATUS FOR FITTING A CYLINDER HEAD COVER

FIELD OF THE INVENTION

The present device relates to an apparatus for fitting a cylinder head cover of an internal combustion engine.

BACKGROUND OF THE INVENTION

In an internal combustion engine, especially on OHC (overhead cam shaft) engine, there is a problem of oil leakage from the fitted portions of the cylinder head cover within which the quantity of splashed oil becomes substantial due to the high speed and efficiency of the engine. There is also a problem of transmission of noise as caused by the valve actuating system.

The present invention provides a structure for securing a cylinder head cover to the cylinder head, which structure effectively overcomes the above problems. More specifically, the structure of this invention is able to provide a desirable seal between the cover and the mounting bolt to effectively prevent leakage of oil from the cover, while at the same time permitting the use of a seal formed from an elastomeric material which not only forms an effective sealed relationship, but also minimizes the transmission of noise from the valve mechanism. The elastomeric seal is covered by a washer which protects the seal from the tightening cap, which washer is prevented from rotating by fitting over at least two bolts to thereby stationarily position and fixedly hold the washer. The seal also passes through a hole in the washer to sealingly contact a bottom wall on the cap to create a sealed relationship therewith.

DETAILED DESCRIPTION

Figure 1:
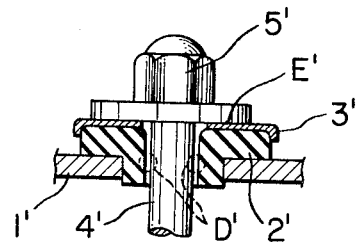
FIG. 1 is a cross-sectional view of a conventional apparatus for fitting a cylinder head cover.
Figure 2:
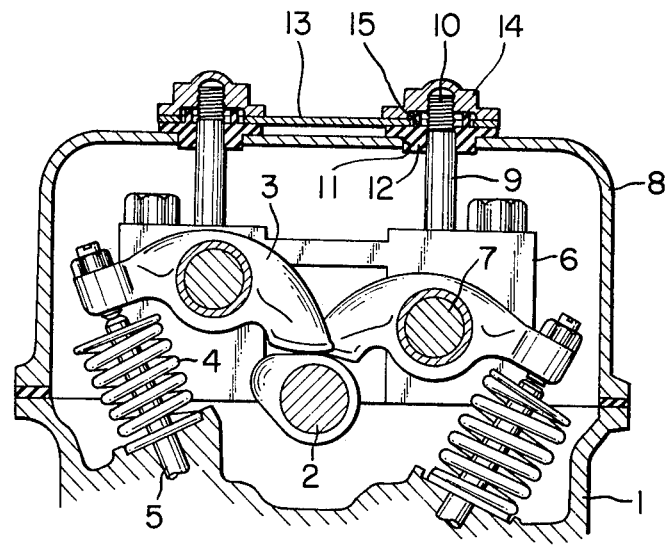
FIG. 2 is a partial cross-sectional view according to the present invention.

A conventional apparatus for fitting a cylinder head cover is first described with reference to FIG. 1.

A cylinder head cover 1' is pressedly fitted to a cylinder head of an internal combustion engine by a cap nut 5' which screws onto the head of a stud bolt 4', with a seal packing 2' and a seal washer 3' being confined therebetween. With this type of structure, particularly when the seal packing 2' is of a soft material such as rubber, a high torque must be applied to the cap nut 5' to effect proper tightening of the cylinder head cover 1'. This often results in the washer 3' being rotated along with the cap nut 5', which in turn can result in breakage or failure of the soft seal packing 2' so that leakage of oil therepast thus results.

Because of the inability of rubber seal packings 2' to withstand the high torque, the seal packing 2' is often manufactured from other materials such as cork which are more capable of withstanding the applied torque. However, these materials are also undesirable inasmuch as they more readily permit the noise of the valve actuating mechanism to be transmitted externally of the valve head cover. Seal packings of such material also provide an inferior seal between the stud bolt 4', and the interior of the seal packing 2', so that oil leaks outside the cylinder head cover 1' through the space between the stud bolt 4' and the interior surface D' of the seal packing 2' and the contact surface E' between the cap nut 5' and the seal washer 3'.

The present invention solves the aforementioned shortcomings and provides an apparatus for securely and sealingly fitting the cylinder head cover of the internal combustion engine, which apparatus permits a high torque to be obtained, provides a superior sealing, and reduces the transmission of noise.

The present device is next described in accordance with FIGS. 2 to 5.

Figure 3:
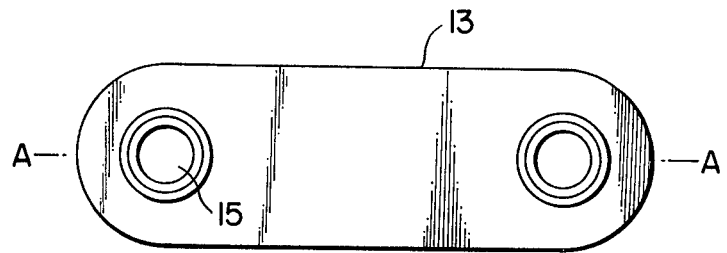
FIG. 3 is a plan view of the washer and the packing according to the present invention.
Figure 4:
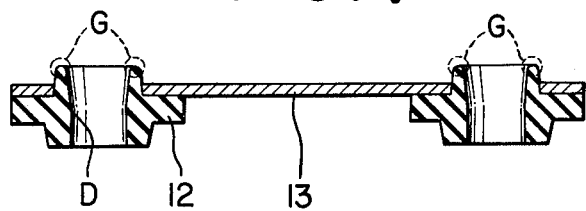
FIG. 4 is a cross-sectional view taken along line A—A of FIG. 3.
Figure 5:
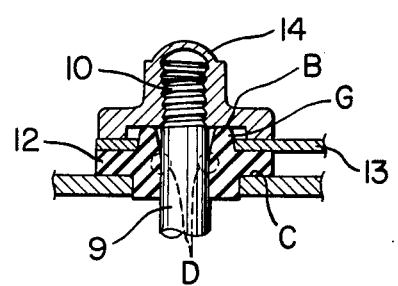
FIG. 5 is an expanded cross-sectional view of the cap nut portion in FIG. 2.

On the cylinder head 1 there is disposed the valve actuating system having a cam shaft 2, a rocker arm 3, a valve spring 4, a valve 5, a rocker support 6, a rocker arm shaft 7, and a stud bolt 9 embedded in the rocker support 6 for fitting the cylinder head cover 8. A head 10 of the stud bolt 9 protrudes through the hole 11 for fixing the cylinder head cover 8, said cylinder head cover 8 being pressed on the cylinder head 1 by a threaded cap nut 14 which acts through a seal packing 12 and a seal washer 13. The seal washer 13 is positioned over at least two stud bolts 9 and is integrally formed in the shape of elongated oval, as shown in FIG. 3, which prevents rotation of washer 13 with the cap nut 14 when the cap nut 14 is rotatably tightened on the bolt 9.

The seal packing 12 is formed with an annular lip G which passes through the hole 15 of the seal washer 13 and come into contact with the end wall B of an annular recess formed in the bottom of the cap nut 14. The seal packing is of a soft elastomeric material so that sealed portions are formed between the seal packing 12 and the cylinder head cover 8 at place C, between the lip G and the wall B of the cap nut 14, and between the stud bolt 9 and the interior surface D of the seal packing by a compression of said interior surface D when the cap nut 14 is screw tightened on the head 10 of stud bolt 9. The annular edge of cap nut 14, which edge surrounds the recess, projects downward by a length which is shorter than the height of lip G so that the lip G comes fully into contact with the end wall B. In this embodiment, oil does not leak outside since any oil leakage past the sealed portion formed between the stud bolt 9 and the interior surface D is sealed at the sealed portion formed between the wall B of the cap nut 14 and the lip G.

Figure 6:
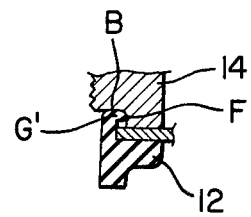
FIG. 6 is a partial cross-sectional view of another embodiment of this invention.

FIG. 6 shows another embodiment in which the end of the lip G is formed larger so that a sealed area is formed between the lip G' and the interior side F of the cap nut 14 as well as the sealed area formed between the lip G' and the bottom wall B.

As will be evident from the above description, this device makes it possible to fix the cylinder head cover securely by a simple construction, to fully prevent oil leakage from the fixed portions, to use soft materials as the seal packing, and to reduce the noise of vibration as caused by the valve actuating from being delivered to the cylinder head cover through the fixed portion.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for fixedly securing a cylinder head cover to the cylinder head of an engine having a bolt embedded in and projecting outwardly of the engine so as to protrude through a hole in the cover, a cap nut engaged with the outer end of said bolt for pressing the cover against the cylinder head, and a seal packing and a washer disposed in surrounding relationship to the bolt and confined between the cover and the cap nut, comprising the improvement wherein the seal packing includes an annular lip portion which projects axially of the seal packing and passes through a hole in the washer, said cap nut having an annular recess formed in and opening axially outwardly from the lower end thereof, said annular recess being concentric with said bolt and surrounded by an annular flange which is integral with said cap nut, said lip portion projecting into said annular recess and being snugly sealingly engaged with the bottom wall thereof in surrounding relationship to said bolt, said washer being interposed between said seal packing and said cap nut so that the annular flange on said cap nut bears against one side of said washer.

2. An apparatus according to claim 1, wherein said seal packing is of a soft elastomeric material and is of an annular ringlike structure, said seal packing having said annular lip portion disposed at one axial end thereof and having a further annular portion disposed at the other axial end thereof, said further annular portion being disposed in surrounding relationship to the bolt and positioned within the hole formed in said cover, said seal packing also having a central annular portion disposed intermediate the ends thereof and protruding radially outwardly beyond the annular lip portion and said further annular portion, said central annular portion being sealingly clamped between the other side of said washer and the outer surface of said cover, said seal packing also having an inner annular surface disposed in sealing engagement with the outer periphery of said bolt.

3. In an apparatus for fixedly securing a cylinder head cover to the cylinder head of an engine having at least two bolts imbedded in and projecting outwardly of the engine so as to protrude through holes in the cover, a cap nut engaged with the outer end of each said bolt for pressing the cover against the cylinder head, a deformable seal packing positioned in surrounding relationship to each said bolt and sealingly engaged with said cover, and washer means positioned in surrounding relationship to said bolts and disposed between the seal packings and the cap nut, comprising the improvement wherein said washer means comprises a one-piece washer member having a pair of openings defined therein within respective platelike annular portions which are fixedly interconnected by a platelike joining portion, said openings being of substantially larger diameter than said bolts and receiving therethrough said bolts whereby said washer is prevented from rotating relative to said cylinder head, each said seal packing being of a soft annular material and formed as an annular ringlike structure, said seal packing having an inner annular surface disposed in snug sealing engagement with the outer periphery of said bolt, said seal packing also including an annular lip portion which projects axially of the respective seal packing and passes through the respective opening in the washer, said annular lip portion being disposed in snug sealing engagement with an end wall of said cap nut in surrounding relationship to said bolt.

4. An apparatus according to claim 3, wherein each said seal packing includes an intermediate annular portion which projects radially outwardly beyond said annular lip portion and is sealingly clampingly confined between the under side of the washer and the exterior surface of said cover, said seal packing also including a reduced diameter annular portion adjacent the other end thereof confined within the hole in said cover in surrounding relationship to said bolt.

5. An apparatus according to claim 3 or claim 4, wherein each said cap nut has an annular recess formed in and opening axially outwardly from the lower end thereof, said annular recess being concentric with said bolt and surrounded by an annular flange which is integral with said cap nut, said lip portion projecting into said annular recess and being snugly sealingly engaged with the bottom wall thereof, said annular flange on said cap nut bearing against the adjacent side of said washer.

* * * * *